Oct. 16, 1962 K. EBNER 3,058,806
METHOD OF PREPARING POTASSIUM SULFATE FROM KAINITE
Filed Jan. 13, 1960
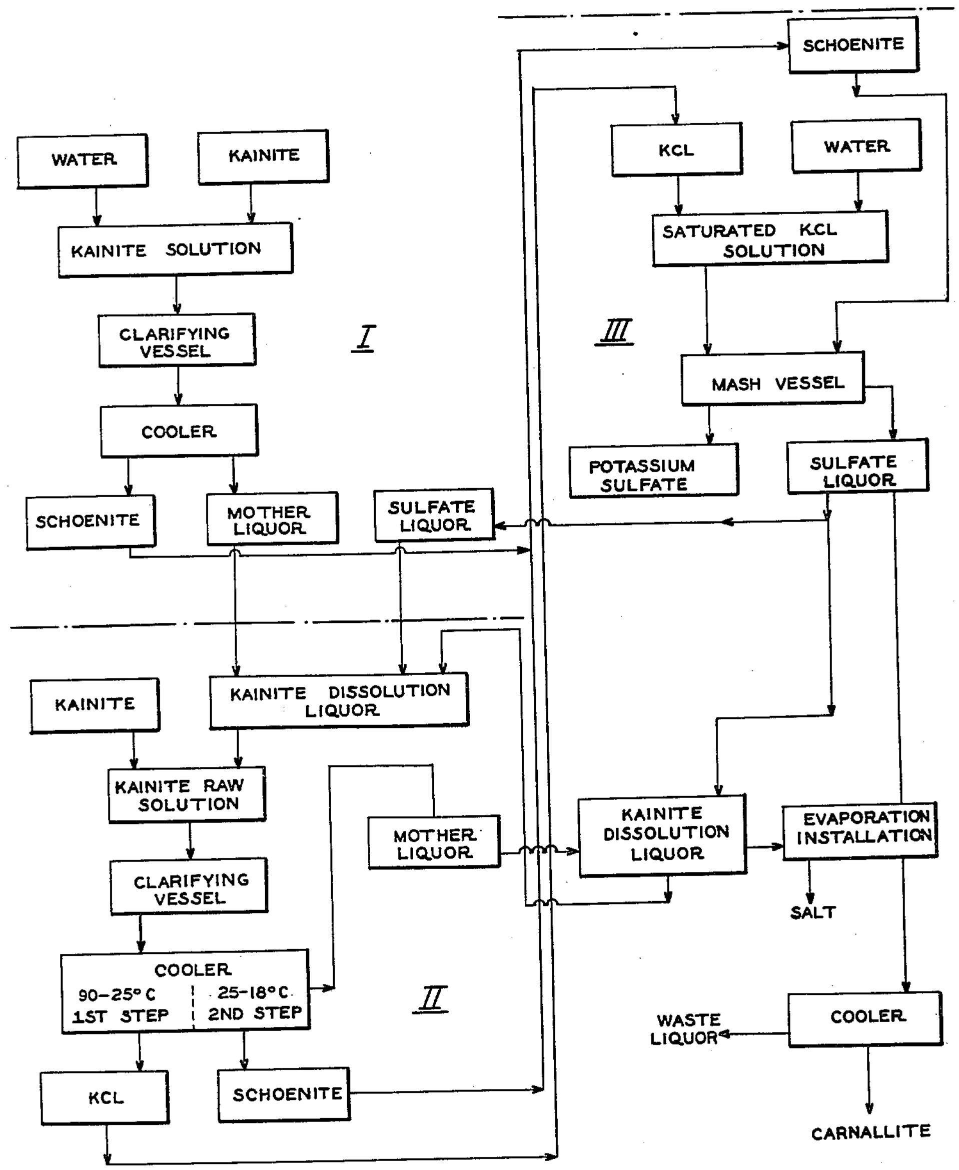
INVENTOR.
KARL EBNER
BY
Burgess Dinklage & Sprung
ATTORNEYS 3,058,806
Patented Oct. 16, 1962

3,058,806

METHOD OF PREPARING POTASSIUM SULFATE FROM KAINITE

Karl Ebner, Oberursel (Taunus), Germany, assignor to Metallgesellschaft Aktiengesellschaft, Frankfurt am Main, Germany, a German corporation Filed Jan. 13, 1960, Ser. No. 2,197
Claims priority, application Germany Jan. 16, 1959
10 Claims. (Cl. 23—121)

The present invention relates to a novel method of the manufacture of potassium sulfate from the mineral of kainite ($KCl.MgSO_4.3H_2O$).

Heretofore, potassium sulfate has primarily been recovered from the minerals sylvite (KCl), langbeinite ($K_2SO_4$—$2MgSO_4$), schoenite ($K_2SO_4.MgSO_4.6H_20$) or leonite ($K_2SO_4.MgSO_4.4H_20$). It has been suggested to obtain potassium sulfate from kainite ($KCl.MgSO_4.3H_2O$)

Thus, for example, it is known to prepare a cold saturated solution of kainite and use this for extracting fresh kainite at a temperature of about 80° C. The clarified solution deposits crystals of schoenite on cooling and the mother liquor, rich in magnesium, sodium and potassium chlorides, is utilized in the extraction of potassium chloride from carnallite. In another process, the kainite is treated with water of previous liquors at a temperature of 120–145° C. with a steam pressure of from 2–7 atmospheres. By a mechanical arrangement of stirrers, the double salt ($K_2SO_4.2MgSO_4.H_2O$), which is formed, can be separated from the residual rock-salt and from the solution. The double salt so formed is converted into schoenite by agitation with a small quantity of water. Processes, where the kainite is merely dissolved in hot water and the solution cooled, whereby schoenite ($K_2SO_4.MgSO_4.6H_2O$)

is separated out, result in wholly inadequate yields of potassium sulfate. The filtrate or mother liquor remaining after separation of the schoenite crystals contains magnesium sulfate, magnesium chloride and potassium chloride in solution. Almost 50% of the potassium chloride contained in the kainite is lost in the mother solution and can only be uneconomically recovered therefrom. If the mother liquor obtained from the dissolution of the kainite is, after separation of the schoenite, utilized for the further dissolution of kainite, then in the subsequent cooling predominantly sodium chloride and potassium chloride and some schoenite are separated out. However, the potassium chloride is very much contaminated by sodium chloride. If the mother liquor is re-used for further leaching operations, then with the increasing magnesium chloride content of the mother liquor less and less schoenite is separated out, until ultimately there is obtained a salt mixture consisting predominantly of magnesium sulfate and magnesium chloride and very minor amounts of potassium chloride.

It is therefore apparent that, by utilizing with kainite a hot leaching process with subsequent cooling, the mother liquor being reserved for re-use in dissolving further kainite, a satisfactory yield of potassium sulfate is not obtained.

One object of the invention is the production of potassium sulfate from kainite ($KCl.MgSO_4.3H_2O$) in better yields than it was heretofore possible.

Another object of the invention is the production of potassium sulfate from kainite from solutions containing potassium chloride in better yields than was heretofore possible.

A third object of the invention is the recovery of a mother liquor having a substantially higher concentration of potassium chloride from conversion solutions used in the production of potassium sulfate.

These and further objects of the invention will become apparent from the description thereof, read in conjunction with the drawing, which represents a flow sheet, diagrammatically illustrating the process of the invention.

As contrasted with prior conventional procedures, as outlined above, in accordance with the invention it is now possible to obtain yields of potassium sulfate, calculated with reference to the potassium content of the kainite of 95% and above, which represent a significant increase as compared with prior conventional processes. At the same time, the yields of potassium chloride obtained from the conversion solutions range correspondingly exceedingly higher. The potassium chloride contained in the conversion solutions is, in accordance with the invention, almost substantially completely converted into potassium sulfate.

In accordance with the invention, the mother liquor, remaining after the hot leaching dissolution of the kainite and subsequent crystallization of the schoenite, is utilized together with potassium sulfate liquor for the further hot leaching dissolution of additional kainite. The solution obtained is cooled in two stages, wherein potassium chloride and schoenite are separated out, and the mother liquor thereby obtained is returned in part for the dissolution of further kainite. Thereafter, the schoenite, crystallized out in the entire process together with the potassium chloride obtained, is converted in known manner to potassium sulfate. The sulfate liquor remaining therein is again used, in accordance with the invention, for the dissolution of the kainite.

The process in accordance with the invention is carried out in three stages (I, II and III, respectively). In stage I, kainite is leached with hot water and the solution obtained is cooled to thereby crystallize out schoenite. The mother liquor from this stage, together with the potassium sulfate liquor obtained in stage III, is used for the hot leaching dissolution of additional kainite in stage II. The solution, which is obtained from the stage II leaching dissolution, is cooled stepwise (2 steps), whereby potassium chloride and schoenite are separated out. The liquor obtained in the stepwise cooling is recycled in part for the further stage II dissolution of additional kainite. In stage III, the schoenite obtained by crystallization from the entire process is converted together with the potassium chloride from stage II to potassium sulfate and the sulfate liquor remaining after conversion is at least in part re-utilized for the dissolution of kainite in stage II. The procedures in stepwise sequence may be seen in the attached drawing.

In practice, in a first stage (stage I) the kainite is dissolved with water maintaining a solution temperature of about 100° C., and the liquor thus obtained is cooled (stage I) to about 30–20° C. At this point in the process there are formed crystals of materials of which more than 90% is schoenite. The mother liquor (stage I), resulting after removal of the schoenite crystals (stage I) is then admixed in a second stage (stage II) of the process with a sulfate liquor recovered from the third stage (stage III) of the process in the ratio of about 3:1 to 2:1, so that a new dissolution liquor is formed with a higher potassium chloride content, but with a smaller magnesium sulfate content than the mother liquor from stage I. The new dissolution liquor is heated to a temperature of about 100° C. and used to treat an additional amount of kainite (stage II), the kainite being dissolved therein. The solution of kainite thereby formed, in accordance with the invention, is cooled in two steps (stage II cooling). In the first step, the solution is cooled down to about 35–25° C., and in the second step further cooling to about 18° C. is effected. The purpose of this two-step cooling is that thereby there is obtained in the first cooling step a salt having a comparatively high percentage (80–90%) of potassium chloride, which potassium chloride is essentially only contaminated with sodium chloride. In the second cooling step there is obtained schoenite of about 90–95% purity. After this cooling (stage II), the mother liquor accumulated is mixed with the sulfate liquor obtained in the third stage of the process. The mixing of the liquors at this point (stage III) is made in a ratio of 2:1 to 3:1 (stage II mother liquor:sulfate liquor), and the liquor is again used for the dissolution of kainite (in stage II). In the cooling of the kainite dissolution liquor used in stage II (for a second time) the mixture of sulfate (e.g., from stages I and III), there is obtained in the first cooling step of the stage II cooling, effected down to 35–25° C., again a very high percentage of potassium chloride, and in the second cooling step of the stage II cooling, i.e. in the cooling from 25° C. to 18° C., a schoenite of over 95% purity is recovered.

When the mother liquor obtained in this instance (stage II) is admixed with the sulfate liquors (stages I and III) and is, for a third time, used as kainite dissolution liquor in a stage II dissolution and cooled, as above described, to (1) 35–25° C. (2) 18° C., then there is recovered an amount of potassium chloride (stage II) (about 80% KCl) making it possible to convert therewith in the third stage of the process the entire schoenite crystallized out in the process into potassium sulfate. In practical operation, those quantities of mother liquor and/or sulfate liquor are maintained in the circulating system, so that the entire process takes place continuously. If heat exchange benefits are availed of, it is apparent that the costs of operating the total process may be held to a very minimum.

In the third stage of the process, the potassium chloride obtained (in stages II and III) is added to water or preferably to a part of the sulfate liquor with stirring, and thereby there is produced at a temperature of about 30° C. a saturated potassium chloride solution. The saturated potassium chloride solution thus produced is now admixed under stirring in a special vessel with all of the schoenite separated up to this point in the process, and potassium sulfate is crystallized out. Thereby the entire content of potassium chloride contained in the kainite charged to the system is present as potassium sulfate and/or potassium chloride in the final liquor.

The accumulated final liquor is now concentrated by evaporation preferably in multiple stages, so as to eliminate about one half of the water contained therein through evaporation. At this point in the process, there are formed, in the order noted, crystals of schoenite, potassium chloride and sodium chloride. With the cooling of this liquor, which has been concentrated by evaporation, finally crystals of carnallite come out of the solution. The crystals formed could be discarded, but if, as in the present process, it is desirable to save as much potassium and sulfate as possible, the discarding of the crystals at this stage would result in discarding a molecule of potassium with each molecule of sulfate, in view of the fact that most of the sulfate crystallizes out in some form of potassium sulfate. Therefore, the crystals formed in the concentration are preferably settled in a dense slurry and returned to a prior stage of the process, where the same are converted ultimately to potassium sulfate, whereby yields of an exceedingly high order are obtained. The yield of potassium sulfate, referred to the content of potassium in the kainite, amounts to about an average value of 95%.

In the process of the invention, sulfate liquors of any other origin may be utilized in admixture with the mother liquor of stage I in stage II for the production of a kainite dissolution liquor.

The process in accordance with the invention may further be improved in that the excess sulfate liquor obtained in the process may be used as covering liquor for the removal of the sodium chloride from the potassium chloride, which is recovered in stage II of the process. The liquor, which is obtained in this manner, may (just as the otherwise final liquor is obtained in the process) be fed into an evaporation unit, so that the residual potassium may be recovered.

The process in accordance with the invention may furthermore be improved, in that the crude kainite is first floated in the manner known for such operation. In accordance with the invention, this flotation is effected, employing therefore the kainite mother liquor. It is possible in this manner to remove from the kainite about 80% of the sodium chloride contaminating the kainite crystals. Thus, the sodium chloride content of the solution is decreased and simultaneously the potassium chloride content increases as is desired. As a result, there is not only a high percentage of potassium chloride obtained, but the crystalline products are also purer and the process becomes simpler as regards apparatus.

One embodiment of the invention may be illustrated by the attached flow-sheet. As there shown, in the first stage kainite in suitably divided form is fed at a rate of about 85 tons per hour into the raw solution stage together with water fed thereinto at the rate of about 130 m.$^3$ per hour. In the raw solution stage (stage I) the solution is maintained at 100° C. From the raw solution stage the kainite solution is continuously passed into a clarifier (stage I) at the rate of about 150 m.$^3$ per hour. In the clarifier the impurities or undissolved matter are removed in conventional manner whereupon the solution continuously moves into the cooler (stage I), wherein the same is continuously cooled down to a temperature of about 20 to 30° C. Solid schoenite separating in the cooler (stage I) is continuously removed in suitable manner from the cooler (stage I) at the rate of about 31 tons per hour while mother liquor is also removed from the cooler (stage I) at the rate of about 140 m.$^3$ per hour being transported at this rate into dissolution stage II where it is admixed with sulfate liquid (stage III) and from which it passes into the second raw solution stage at the rate of 210 m.$^3$ per hour, for the solution in said second raw solution stage with continuously thereinto flowing amounts of additional kainite in suitably divided form being added to the second raw solution stage at the rate of about 35 tons per hour. This (stage II) solution of the kainite is effected so as to maintain the second raw solution stage also at a temperature of about 100° C. the second raw solution being passed into a further clarifier (stake II) at the rate of 220 m.$^3$ per hour and then into a second cooling stage (stage II). The latter is subdivided into two steps, the first of which is cooled to a temperature of about 20–35° C. thereby causing potassium chloride to be separated from the clarified solution. In the second cooling step the balance of the solution is cooled to a temperature of about 18° C. whereby schoenite precipitates. From the first step of the cooling of stage II potassium chloride is continuously removed at a rate of about 11 tons per hour, while from the second step of the cooling of stage II the schoenite is removed at the rate of about 16 tons per hour. There is withdrawn from the second subdivision of the cooling of stage II the second mother liquid which will then be passed to a multiple stage evaporator for the separate precipitation and recovery of sodium chloride, potassium chloride and a mixture of magnesium chloride and magnesium sulfate. The potassium chloride is obtained at a rate of about 14 tons per hour and is then brought together with the potassium chloride from the second cooling stage to a further solution stage (stage III) to which it is fed at the rate of 25 tons per hour together with water at the rate of 53 m.$^3$ per hour there being maintained a saturated potassium chloride solution at a temperature of about 30° C. This constitutes at this temperature substantially saturated potassium chloride solution which is thereafter fed into a mixer in which it is continuously admixed with schoenite at the rate of about 47 tons per hour, the schoenite being derived from the first and second cooling stages. The mixing stage results in the production of the potassium sulfate which is removed therefrom at the rate of 33 tons per hour precipitated sulfate. The remaining sulfate liquor from the mixing stage (stage III) is then continuously passed into the second solution stage at the rate of 70 m.$^3$ per hour so as to complete the cycle.

The sulfate of potassium is an extremely important fertilizer material. As is well known, many growing plants are adversely effected by fertilizers containing chlorine. Therefore, it is necessary to make available to these plants the nutritive agent of potassium in a form free from chlorine. The process of the invention makes the potassium sulate fertilizer free of chlorine and available in yields not heretofore possible.

I claim:

1. In the process for the production of potassium sulfate from kainite by the dissolution of kainite in hot water, cooling of the solution formed to thereby crystallize out schoenite, and reacting the schoenite crystals thus obtained in an aqueous medium containing potassium chloride so as to form a precipitate of potassium sulfate, the improvement which comprises in a first stage effecting the dissolution of kainite in water at a temperature of about 100° C., cooling the solution thereby formed, separating schoenite crystals from the liquor resulting from the cooling, utilizing said mother liquor remaining after separation of the schoenite crystals in a second stage together with the predominant portion of the sulfate liquor resulting from the final and third stage for the dissolution of further kainite, said second stage dissolution of kainite being effected at a temperature of about 100° C., thereafter cooling the dissolution solution thereby obtained in two steps, separating the crystals of potassium chloride resulting in the first of said two cooling steps and schoenite crystals formed in said second cooling step from the motor liquor, using at least a part of the latter mother liquor remaining after separation of the potassium chloride and schoenite crystals for the dissolution of further kainite in the second stage, thereafter in a third stage reacting all of the schoenite crystals recovered in the first and second stages with the potassium chloride from the second stage so as to form a precipitate of potassium sulfate in a sulfate mother liquor, using the sulfate mother liquor after removal of the potassium sulfate crystals formed at least in part for the dissolution of further kainite in the second stage.

2. Process according to claim 1, which comprises utilizing in the second stage a dissolution solution obtained by admixing mothr liquor from the first stage with potassium sulfate liquor from the third stage in the ratio of 3:1 to 2:1.

3. Process according to claim 1, which comprises effecting the cooling of the dissolution solution in said second stage in a first step to about 25° C. and in a second step to about 18° C.

4. Process according to claim 1, which comprises utilizing a portion of the sulfate mother liquor from the third stage as a covering liquor to effect the removal of sodium chloride from the potassium chloride.

5. Process according to claim 1, which comprises employing as the starting kainite a pure kainite obtained by the floatation of crude kainite.

6. Process according to claim 1, which comprises effecting the cooling of the dissolution solution in said first stage to about 20° C.

7. Process according to claim 1, in which said mother liquor derived following cooling from said second stage is concentrated by evaporation.

8. Process according to claim 4, which comprises concentrating by evaporation the final liquor obtained in the process, removing sodium chloride from the potassium chloride and recovering the carnallite formed.

9. Process according to claim 5, which comprises employing for the said floatation kainite mother liquor.

10. Process according to claim 1, wherein said three stages are carried out continuously.

References Cited in the file of this patent

UNITED STATES PATENTS

| | | |
|---|---|---|
| 2,895,794 | Dancy et al. | July 21, 1959 |
| 2,902,344 | Cevidalli et al. | Sept. 1, 1959 |

OTHER REFERENCES

Mellor: "A Comprehensive Treatise on Inorganic and Theoretical Chemistry," Longmans, Green and Co., New York, N.Y., volume 2, 1922, pages 659 and 660.